United States Patent [19]

Noding et al.

[11] Patent Number: 4,804,582

[45] Date of Patent: Feb. 14, 1989

[54] STATIC DISSIPATIVE THERMOPLASTIC LAMINATE FILM

[75] Inventors: Stephen A. Noding, Brusly; Sanford A. Siegel; Donald W. Pennington, both of Baton Rouge, all of La.

[73] Assignee: The Dow Chemical Company, Midland, Mich.

[21] Appl. No.: 56,037

[22] Filed: Jun. 1, 1987

[51] Int. Cl.$^4$ .................. B32B 9/00; B32B 27/08
[52] U.S. Cl. ........................ 428/332; 428/340; 428/408; 428/330; 428/518; 428/922; 428/520
[58] Field of Search ........... 428/332, 330, 340, 408, 428/518, 922

[56] References Cited

U.S. PATENT DOCUMENTS

| | | | |
|---|---|---|---|
| 4,272,616 | 6/1981 | Kishimoto | 430/529 |
| 4,614,695 | 9/1986 | Ibbott | 429/127 |
| 4,620,026 | 10/1986 | Siegel | 560/85 |
| 4,698,256 | 10/1987 | Giglia et al. | 428/412 |

OTHER PUBLICATIONS

Rogers, J. L., "Controlling Static Electricity in PVC Packaging", Journal of Vinyl Technology, Jun. 1984, vol. VI, No. 2.
Chem. Abst., vol. 71, 1969, No. 71CA18–61947b.
Chem. Abst., vol. 71, 1969, No. 74CA29–43018g.

*Primary Examiner*—P. C. Ives

[57] ABSTRACT

This invention relates to a static dissipative laminate film produced by: coating a surface of a first plasticized thermoplastic film with graphite or carbon; overlaying the coated surface of the first film with a second plasticized thermoplastic film; and pressing the first and second films together to form a laminate film.

17 Claims, No Drawings

STATIC DISSIPATIVE THERMOPLASTIC LAMINATE FILM

BACKGROUND OF THE INVENTION

This invention relates to thermoplastic films having static dissipative properties.

Antistatic agents have been used in the plastics industry for many years. In early usage, these agents functioned to reduce dust and dirt pick-up by plastic phonograph records, resin powders and plastic packaging materials, e.g., bottles and films. More recently, antistatic agents have the additional role of protecting electronic components which are marketed in thermoplastic film packaging. Without the use of a good antistatic system for a film package, an electronic component contained therein can be subjected to electrostatic discharge which can catastrophically destroy the component's efficacy or can create a latent defect in the component. These adverse effects are often seen when the electronic component is a solid state electronic device, such as computer chips which contain several semiconductive layers. Due to miniaturization and assignment of many functions to a single chip, the semiconductor layers are required to be very thin. Thus, even relatively small electrostatic discharges, say less than 500 V, can burn through the semiconductor layer and induce latent defects in or completely destroy the functionality of the semiconductor layer.

To reduce electrostatic buildup, the thermoplastic film industry has developed three types of antistatic treatments for such films, i.e., (1) applying an antistatic agent to the surface of the film, (2) rendering the film internally conductive, and (3) providing the film with an internal hydrophilic agent which gradually migrates to the film's surface.

An antistatic agent can be applied as a coat on the surface of the film by using dipping, spraying or wiping techniques. Exemplary of such antistats are Armak Company's ARMOSTAT 100C, 900, 910 and 920, which are quaternary ammonium compounds, and Ashland Chemical Company's VARSTAT K-22, which is an amine compound. The coating applied is conductive and thus is dissipative of the electrostatic charge. One drawback of surface treatment is that the coating can be worn or scuffed off, thereby yielding areas which can be susceptible to electrostatic charge buildup.

Rendering the film internally conductive is achieved, in non-cellular plastics, by incorporating, as an additive, a conductive material, e.g., conductive carbon, graphite fibers and carbon fibers, in the thermoplastic composition used to produce the film. The use of such additives is not a panacea though, as the additive may not be uniformly dispersed in the film or may adversely affect the desired physical properties of the film.

The use of an internal hydrophilic antistatic agent in the thermoplastic composition can give film produced therefrom an internal source of an antistatic agent. The agent gradually migrates from the interior of the film to its surfaces. Once at the film's surfaces, the hydrophilic nature of the antistatic agent causes a film of moisture to form on the surfaces and it is this film of moisture which provides the conductance needed to allow for electrostatic charge dissipation from the film. Since the antistatic agent is constantly migrating to the film's surface, a replenishable conductive surface is continually provided. These types of antistatic agents must, in general, be incompletely compatible with the plastic so that the migration phenomen is effected. Exemplary of such antistatic agents are quaternary ammonium compounds and ethoxylated phenolics. One factor weighing against using this treatment is that the formed film of moisture can adversely affect metals or other moisture sensitive items with which the film may come in contact.

Thus, there is a need for a novel thermoplastic film which has static dissipative properties but which does not suffer at all or at least to the same degree the limitations and difficulties delineated above for prior art thermoplastic films. It is therefore a object of the invention to provide such a thermoplastic film and a process for producing same.

The Invention

This invention relates to thermoplastic films which have excellent antistatic properties—indeed, the films of this invention have exhibited resistivities as low as $10^8$ ohms/square. Further, films prepared in accordance with the process of this invention exhibit acceptable transparency which is beneficial in the packaging industry. The subject films are a laminate of at least two thermoplastic film laminae. The laminate is produced by a process which includes: providing first and second thermoplastic films in which each of the films comprises a polymer, cations selected from the group consisting of alkali metal ions and alkali earth metal ions, and a plasticizer which is compatible with the polymer and which is capable of forming a complex with the cations; coating a surface of the first thermoplastic film with an electronically conductive material, such as graphite, carbon or mixtures thereof; overlaying the coated surface of the first thermoplastic film with the second thermoplastic film; and pressing the first and second thermoplastic films together to form the laminate film.

A preferred laminate film is one in which a surface of the second thermoplastic film is also coated with the electronically conductive material and in which the first and second thermoplastic films are pressed together with the two coated surfaces facing one another.

The polymer constituent of the first and second thermoplastic film compositions can be any of those polymers conventionally used to produce thermoplastic films so long as the two films can be pressed together to form a high quality laminate. For example, the polymer constituent may be poly(vinyl chloride), chlorinated polyethylene, poly(vinylidene chloride), a copolymer of vinyl chloride and vinylidene chloride, etc. The most preferred polymer is poly(vinyl chloride).

The plasticizer utilized in the thermoplastic film composition should have that degree of compatibility with the polymer constituent which is conventional in the film industry. Also, the plasticizer must be able to complex with cations present in the thermoplastic film so that a conductive ionic pathway to the polymer matrix is provided.

Due to their commercial availability, polymer compatibility and complexing ability, two preferred classes of plasticizers are diesters of $C_4$ to $C_8$ dicarboxylic acid which contains three or more ethoxy ether linkages, e.g., diesters of dibenzoic acid, and ethylene glycol di(carboxylates) containing three or more ethoxy ether linkages. Exemplary of the former are di-(butyl ethoxy ethoxy) glutarate (DBEEG), di-(butoxy ethoxy ethoxy) adipate (DBEEA), and di-(butoxy ethoxy ethoxy ethoxy) terephthalate (DOWANOL TBH). The ethylene glycol di(carboxylates) are exemplified by tetraethylene glycol (2-ethylhexanoate) (TEGMER 804), triethylene glycol (2-ethylhexanoate) (TEGMER 803), tetraethylene glycol (methyl hexanoate) (TEGMER 704) and triethylene glycol (methyl hexanoate) (TEGMER 703). DBEEG, DBEEA, TEGMER 804, TEGMER 803, TEGMER 704 and TEGMER 703 are available from C. P. Hall Company of Chicago, Ill., while DOWANOL TBH is available from The Dow Chemical Company of Midland, Mich.

While several specific plasticizers have been delineated above, it is to be understood that other plasticizers are suitable so long as they have the necessary compatibility an complexing ability discussed above. For example, another useful plasticizer is the mixed diesters of terephthalic acid which ar represented by the formula:

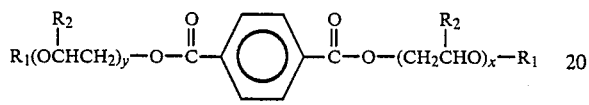

wherein $R_1$ is a phenyl radical or an aliphatic hydrocarbon radical of the formula $C_nH_m$ wherein n is an integer of 1 through 8 inclusive and m is equal to $2n+1$, $R_2$ is either hydrogen or an aliphatic hydrocarbon radical of the formula $C_rH_s$ wherein r is an integer of 1 through 4 inclusive and s is equal to $2r+1$; x is 2, 3 or 4; and y is 2, 3 or 4. Preferred diesters of terephthalic acid are represented by the above formula wherein n is an integer of 1 through 4 inclusive and $R_2$ is either hydrogen or a methyl radical. Also useful are the mixed triesters of trimellitic acid which are represented by the formula:

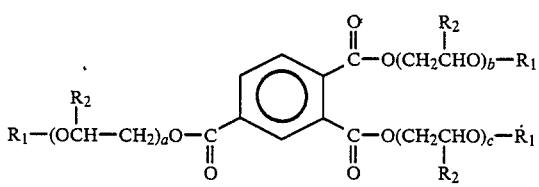

wherein $R_1$ is a phenyl radical or an aliphatic hydrocarbon radical of the formula $C_nH_m$ wherein n is an integer of 1 through 8 inclusive and m is equal to $2n+1$; $R_2$ is either hydrogen or an aliphatic hydrocarbon radical of the formula $C_rH_s$ wherein r is an integer of 1 through 4 inclusive and s is equal to $2r+1$; x is 2, 3 or 4; and y is 2, 3 or 4. Preferred esters of trimellitic acid are represented by the above formula wherein n is an integer of 1 through 4 inclusive and $R_2$ is either hydrogen or a methyl radical.

The just described diesters and triesters may be prepared either by direct esterification or by transesterification. Transesterification is preferred because of shorter reaction times.

In preparing mixed terephthalate diesters by transesterification, a dialkyl terephthalate, such as dimethyl terephthalate, and a mixture of polyalkylene glycols and polyalkylene glycol monoalkyl ethers are heated to a temperature of about 235° C. in the presence of a catalytic amount of calcium acetate for a short period of time while methanol is collected overhead. As the reaction proceeds, pressure is gradually reduced and excess polyalkylene glycols and polyalkylene glycol monoalkyl ethers are removed by distillation to leave the diester product. The product may be used as is. If desired, the product may be further purified by an aqueous extraction with subsequent drying. A similar reaction is used to prepare the triester. Trimethyl trimellitate is not, however, readily available. Therefore, a higher, more readily available, triester, such as trioctyl trimellitate, should be used as a starting material in making the triester products.

One skilled in the art of organic chemistry could, if desired, substitute alternate starting materials and catalysts for those illustrated hereinabove to obtain alternate embodiments of the diesters and triester products. Similarly, a single polyalkylene glycol or polyalkylene glycol monoalkyl ether could be used rather than a mixture thereof.

Starting materials for preparing the mixed diester and triesters by transesterification are commercially available. A mixture of diethylene glycol butyl ether, triethylene glycol butyl ether, tetraethylene glycol butyl ether, diethylene glycol, triethylene glycol, tetraethylene glycol and higher ethers and glycols is available from The Dow Chemical Company under the trade designation DOWANOL TBH. Other alkylene glycols and alkylene glycol monoalkyl ethers are also available from The Dow Chemical Company either singly or as mixtures thereof. Dimethyl terephthalate is available from Hercofina Chemical Company and other commodity producers.

Since the use of plasticizers in thermoplastic film compositions has long been practiced by the art, and since the amounts of plasticizer used for the purpose of this invention are conventional, one skilled in such art will be able to readily determine the amount of plasticizer to be used without undue experimentation.

The cations found in the thermoplastic film composition are alkali metal ions, alkaline earth metal ions, or a mixture thereof. Such cations can be provided to the composition as the cationic portion of a conventional additive, e.g., by the UV stabilizer, sodium stearate and/or as the cationic portion of a salt added to the composition solely for the purpose of providing the cation to the composition. Preferred cations are $Na^+$, $Li^+$, $Ca^{++}$, $Mg^{++}$ due to their good ionic mobility. The most highly prefered cations are $Na^+$ and $Li^+$. It has been found convenient to provide the cations to the thermoplastic film composition as a fatty acid salt, e.g., sodium stearate, lithium palmate, calcium stearate, etc. Quantitatively, the cation concentration in the thermoplastic film composition is sufficiently high to provide good ionic conductance but not so high as to cause, by itself or in conjunction with its anionic couple, a degradation of the physical properties of the film. Generally, a cation concentration of from about 0.05 to about 0.25 parts, based upon 100 parts of the polymer constituent, is suitable.

The electronically conductive material used to coat either one or both of the films preferably has an average particle size within the range of from about 0.1 to about 5 microns. Graphite has been found to be especially useful a the electronically conductive material due to its high conductivity and its ready availability in a very fine form. The coating of the films is achieved in a conventional manner such as by spraying or wiping. The thickness of the coating which can be achieved is dependent upon the mechanical capability of the graphite or carbon to achieve structural attachment to the film. Generally speaking, the coat will have a thickness of from about 1 micron to about 10 microns depending upon the average particle size of the graphite or carbon. When graphite, having an average particle size of from about 0.5 to about 2 microns is used, a coating thickness of from about 1 to about 5 microns is suitable. It is a unique feature of the laminate films of this invention that they contain only from about 0.01 to about 0.1 mg of electronically conductive material per square centimeter of film surface coated and still obtain high antistatic qualities. Since the amount of graphite or carbon incorporated in the laminate film of this invention is dependent only upon the amount of graphite or carbon which can be applied as a self-supporting coating on either one or both of the two starting films, the same amount of graphite or carbon will be present in the laminate film, irrespective of the starting thickness of the first and second films. Such a small amount of electronically conductive material would not be deemed by those skilled in the art to be sufficient to achieve these good antistatic qualities in view of the prior art which teaches that electronically conductive materials should be present in much larger amounts, say about 10 mg/cm$^2$. See, for example, Japanese Patent Application, Ser. No. 278,492. An especially beneficial feature resulting from using small amounts of electronically conductive material is that the laminate films of this invention are nearly transparent, or at least translucent, whereas prior art films, containing conventional amounts of electronically conductive material, are basically opaque. Further, the subject laminate films also retain the good physical properties inherent in the first and second films whereas, with prior art loadings of graphite or carbon, such physical properties are adversely affected.

It is also a feature of this invention that the particles of electronically conductive material are pressed into the interior of the first and second thermoplastic films during lamination and that the particle concentration in the laminate is greatest at its center and diminishes in a direction towards the laminate's surfaces. It is theorized, though this invention is not confined to this theory, that the pressing of the particles into the first and second films and the existence of concentration gradient are greatly responsible for the good antistatic properties of the laminate.

After one or both of the first and second films have been coated with graphite or carbon, they are overlain so that the graphite or carbon coating will be captured between the two films. The films are then heated to a temperature just below their fusion or softening temperature and are pressed together so as to form the laminate film.

The laminate film should have a thickness within the range of from about 20 microns to about 200 microns as a film thickness within this range is capable of exhibiting good antistatic qualities and is acceptable for use by the packaging industry. The thickness of the laminate film is determined by the physical properties and the initial thicknesses of the first and second films, the temperature and pressure used in forming the laminate, and, to a lesser extent, the thickness of the graphite or carbon coat. It has been found that with this number of variables that the obtainment of a particular laminate thickness is best achieved empirically. For example, empirical work suggests that if the first and second films are both about 50 microns thick and of conventional plasticized poly(vinyl chloride), the use of a temperature within the range of from about 130° C. to about 150° C. and a pressing force of from about 200 kg/m$^2$ to about 500 kg/m$^2$ will produce a useful packaging laminate. The laminate film can be expected to have a thickness within the range of from about 40 microns to about 80 microns.

In most cases, the pressure used to form the subject laminate film will be in the range of from about 200 kg/m$^2$ to about 500 kg/m$^2$. It is to be understood, however, that experimentation may show that considerably higher pressures, say 1000 kg/m$^2$, are suitable for some first and second films which are not easily laminatable one to the other. Generally, the initial thickness of the first and second films will be within the range of from about 6 microns to about 100 microns. The initial thickness of the two films is determinative, with the other variables being held constant, of the final laminate film thickness and thus should be chosen so as to provide a laminate film which has a thickness within the above recited useful range. Lowering or raising of the pressing force will allow for the selection of, respectively, initially thinner first and second films or initially thicker first and second films. In all cases, however, the pressing force has to be sufficient to yield a high quality laminate film highly resistant to delamination.

The antistatic laminate film of this invention can be commercially produced by conventionally extruding a bubble of film and coating its interior surface with graphite or carbon. This coating can be accomplished by dispersing the graphite or carbon in the cooling air which is fed into the bubble. After such coating has been achieved, the film bubble is heated to a temperature just below its processing temperature. The heated bubble is then passed through pressing rollers which collapse the bubble and press it together to form the desired laminated sheet of film.

The following example is illustrative of the principles of the present invention and is not to be taken as being unduly limiting thereof.

EXAMPLE

A cylindrical length of blown thermoplastic film having a wall thickness of about 38 microns was knotted at one end. The thermoplastic film was comprised, in the main, of 100 parts poly(vinyl chloride), 50 parts TEGMER 804, 2 parts THERMCHECK 820 (a tin stabilizer produced by Ferro Corporation) and 0.1 part sodium stearate. All parts are by weight.

The knotted, cylindrical length of film was inflated from its open end with nitrogen after about 0.5 grams of 1 micron graphite powder was dumped into the interior of the knotted cylinder. The open end of the cylinder was then knotted and the graphite powder was dispersed as a coating about the inside wall of the cylinder by shaking and inverting the cylinder. The cylinder was then deflated by removal of the knots and the excess graphite, i.e., that graphite not adhering as a coat onto the inside wall of the cylinder, was emptied from the now open-ended cylinder. The deflated cylinder was laid flat and placed in a press at about 170° C. and subjected to a pressing force of about 704 kg/cm$^2$. The surface resistivity of the resultant laminate was measured in accordance with EIA-IS-5A. A surface resistivity value of $5 \times 10^8$ Ω/square was obtained.

While the foregoing Example used a certain thermoplastic composition to produce the film, it is to be understood that other compositions can be used. For example, the thermoplastic composition could comprise:

| | |
|---|---|
| PVC polymer | 100 parts |
| Plasticizer | 25 to 65 parts |
| Organotin stabilizer | 0.5 to 4 parts |
| Sodium Stearate | 0.05 to .25 parts |

Other conventional constituents can be used so long as they do not interfere with the antistatic features of the subject laminate film.

We claim:

1. A thermoplastic laminate film produced by a process which comprises,
    (a) providing first and second thermoplastic films, said films comprising,
        (i) a polymer, selected from the group consisting of poly(vinyl chloride), chlorinated polyethylene, poly(vinylidene chloride) and a copolymer of vinyl chloride and vinylidene chloride,
        (ii) cations selected from the group consisting of alkali metal ions, alkaline earth metal ions and mixtures thereof,
        (iii) a plasticizer which is compatible with said polymer and which is capable of forming a complex with cation,
    (b) coating a surface of said first thermoplastic film with an electronically conductive carbon material;
    (c) overlaying the coated surface of said first thermoplastic film with said second thermoplastic film; and
    (d) pressing said first and second thermoplastic films together to form said laminate film.

2. The thermoplastic laminate film of claim 1 wherein said process additionally comprises the step of coating a surface of said second thermoplastic film with an electronically conductive material selected from the group consisting of graphite and carbon and overlaying said first and second thermoplastic films in (c) so that their coated surfaces face one another.

3. The thermoplastic laminate film of claim 1 wherein said polymer is poly(vinyl chloride).

4. The thermoplastic laminate film of claim 3 wherein said conductive carbon material is graphite.

5. The thermoplastic laminate film of claim 4 wherein said laminate contains from about 0.01 mg to about 0.1 mg of electronically conductive carbon material per $cm^2$ of coated film surface.

6. The thermoplastic laminate film of claim 5 wherein said pressing is effected at a temperature of from about 120° C. to about 150° C. and by the application of a pressing force in the range of from about 200 kg/$m^2$ to about 500 kg/$m^2$.

7. The thermoplastic laminate film of claim 6 wherein said laminate has a thickness within the range of from about 20 microns to about 200 microns.

8. The thermoplastic laminate film of claim 2 wherein said polymer is poly(vinyl chloride).

9. The thermoplastic laminate film of claim 8 wherein said conductive carbon material is graphite.

10. The thermoplastic laminate film of claim 7 wherein said laminate contains from about 0.01 mg to about 0.1 mg of electronically conductive carbon material per $cm^2$ of coated film surface.

11. The thermoplastic laminate film of claim 10 wherein said pressing is effected at a temperature of from about 120° C. to about 150° C. and by the application of a pressing force in the range of from about 200 kg/$m^2$ to about 500 kg/$m^2$.

12. The thermoplastic laminate film of claim 11 wherein said laminate has a thickness within the range of from about 20 microns to about 200 microns.

13. The thermoplastic laminate film of claim 1 wherein said plasticizer is selected from the group consisting of diesters of $C_4$ to $C_8$ dicarboxylic acids containing three or more ethoxy ether linkages; ethylene glycol di(carboxylates) containing three or more ethoxy ether linkages; and mixtures thereof.

14. The thermoplastic laminate film of claim 1 wherein said plasticizer is a diester of a dibenzoic acid, which diester contains 4 or more ethoxy ether linkages.

15. The thermoplastic laminate film of claim 1 wherein said cations are sodium or lithium ions.

16. The thermoplastic laminate film of claim 7 wherein said plasticizer is a diester of a dibenzoic acid, which diester contains three or more ethoxy ether linkages and said cations are sodium or lithium ions.

17. The thermoplastic laminate film of claim 12 wherein said plasticizer is a diester of a dibenzoic acid, which diester contains three or more ethoxy ether linkages and said cations are sodium or lithium ions.

* * * * *